United States Patent [19]

Burrus

[11] Patent Number: 4,508,697
[45] Date of Patent: Apr. 2, 1985

[54] HYPOCHLORITE DESTRUCTION USING UREA

[75] Inventor: Harry O. Burrus, Wilmington, Del.

[73] Assignee: E. I. Du Pont de Nemours and Company, Wilmington, Del.

[21] Appl. No.: 518,020

[22] Filed: Jul. 28, 1983

[51] Int. Cl.$^3$ .............................................. C01D 3/04
[52] U.S. Cl. .................. 423/499; 423/473; 423/475; 210/757
[58] Field of Search .................. 423/473–475, 423/499; 210/729, 756–758

[56] References Cited

U.S. PATENT DOCUMENTS 2,784,057  3/1957  Chisnall .................. 423/499 X

OTHER PUBLICATIONS

Urea, Its Properties and Manufacture, pp. 183–194, by George Tsei-Yu Chao, pub. by Chao's Institute, 3014 Larkwood St., West Covina, Calif.

Primary Examiner—Earl C. Thomas

[57] ABSTRACT

A process for destroying waste alkali metal hypochlorite such as sodium hypochlorite is disclosed. The process involves reacting 50–90% and preferably 70–90% of the alkali metal hypochlorite with urea at from 20°–60° C. and pH 6–8 with pH 7–8 being preferred. The remaining alkali metal hypochlorite can be destroyed with a reactant such as sulfur dioxide, sodium sulfite, or sodium thiosulfate.

8 Claims, No Drawings

HYPOCHLORITE DESTRUCTION USING UREA

BACKGROUND OF THE INVENTION

1. Field of the Invention

The present invention relates to a process of destroying alkali metal hypochlorites using urea.

2. Prior Art

"Urea Its Properties and Manufacture," by George Tsei-Yu Chao, pub. by Chao's Institute, West Covina, Calif., discloses the reaction of urea with sodium hypochlorite.

SUMMARY OF THE INVENTION

The present invention relates to a continuous process of destroying aqueous hypochlorite, which can occur as a waste in sodium chloride electrolysis; using less than the stoichiometric amount of urea. The remaining hypochlorite can be destroyed by treatment with $SO_2$ if desired. The resulting effluent has a biological oxygen demand (B.O.D) of less than 15 ppm.

DETAILED DESCRIPTION

The reaction of waste aqueous 5-10 wt % hypochlorite with a stoichiometric amount of urea is known and produces an effluent with a B.O.D. of about 60. The federal Environmental Protection Agency requires that effluents discharged to rivers have a B.O.D. of less than 15. The present invention relates to the discovery that when using less than the stoichiometrically required amount of urea to destroy waste aqueous hypochlorite the B.O.D. of the waste stream can be reduced to an acceptable level. At 50% of stoichiometric urea based on hypochlorite, the B.O.D. effluent is essentially zero. At 70-90% of stoichiometric urea based on hypochlorite, the B.O.D. of the effluent is in the 3-14 ppm range. Thus, from 50% to 90% of the stoichiometrically required urea should be used with from 70-90% being the preferred range.

The major reaction in the process is:

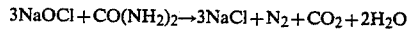

$$3NaOCl + CO(NH_2)_2 \rightarrow 3NaCl + N_2 + CO_2 + 2H_2O$$

Surprisingly, when using 50-90% of the stoichiometrically required amount of urea, a much larger amount of hypochlorite is destroyed. This appears to occur by means of a disproportionation of the hypochlorite as follows:

$$3NaOCl \rightarrow NaClO_3 + 2NaCl$$

Generally the reaction should be run at from 20°–60° C. Both below about 20° C. and above about 60° C. there is a decrease in the amount of hypochlorite converted.

Generally the pH of the reaction mixture will be maintained from 6 to 8 with 7 to 8 being the preferred range. If the pH is much above 8, the excess base reacts with the $CO_2$ which is given off by the primary reaction. Furthermore, the amount of sodium hypochlorite destroyed, based on the urea feed, begins to drop. Generally in a continuous operation the feed rate of hypochlorite to the reactor will be from 60 to 600 grams per liter per hour.

After reaction with urea the remaining hypochlorite can be reacted in the conventional manner with sulfur dioxide, sodium sulfite, sodium thiosulfate, or a similar sulfur compound capable of destroying hypochlorite. When discharging into some municipal sewage systems, the presence of some hypochlorite may be desirable; and therefore, it may not be necessary to remove the residual hypochlorite. When discharging into a river, it is necessary to destroy the residual hypochlorite. This is done most simply by reaction with sodium sulfite.

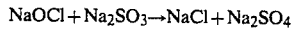

$$NaOCl + Na_2SO_3 \rightarrow NaCl + Na_2SO_4$$

The sodium sulfite can be generated by adding sulfur dioxide to the system to neutralize the sodium carbonate and bicarbonate present and generate the sodium sulfite.

EXAMPLE 1

To a two liter jacketed reactor fitted with an agitator, thermometer, a recycle line, and an off gas line are fed in separate lines sodium hypochlorite, urea, water, and sulfuric acid. An aqueous solution containing 5.25 wt % sodium hypochlorite, and 1.05 wt % sodium hydroxide is fed to the reactor at a rate of 38.1 g/minute. A 10 wt % aqueous solution of urea is fed to the reactor at a rate of 4.9 g/minute (90% of theory). Distilled water is fed to the reactor at a rate of 39 cc/min. Ten percent aqueous sulfuric acid is used to maintain pH 8 in the reactor. The reactor is maintained at 60° C. The liquid effluent from the bottom of the two liter reactor is fed through a 50 ml reactor. Sulfur dioxide is bubbled through the 50 ml reactor at a rate of 10 cc/minute (as measured at standard temperature and pressure). Off gas from the two liter reactor evolves at about 10 liters (at STP) per hour and is fed through a scrubbing tower containing sodium hydroxide. The liquid effluent from the two liter reactor contains 0.01 wt % sodium hypochlorite which corresponds to destruction of 99.6% of the sodium hypochlorite. The effluent from the 50 ml reactor is devoid of sodium hypochlorite and has a five day B.O.D. of 14 ppm.

EXAMPLE 2

Using the apparatus described in Example 1, an aqueous solution containing 5.38 wt % sodium hypochlorite and 1.0 wt % sodium hydroxide is fed to the two liter reactor at a rate of 37.1 g/minute. A 5 wt % aqueous solution of urea is fed to the two liter reactor at a rate of 7.5 g/minute (70% of theory). Distilled water is fed to the two liter reactor at a rate of 44 cc/minute. Ten percent aqueous sulfuric acid is used to maintain pH 8. The reactor is maintained at 60° C. The liquid effluent from the bottom of the two liter reactor is fed through a 50 ml reactor. After startup sulfur dioxide is bubbled through the 50 ml reactor at a rate of 35 cc/minute (as measured at standard temperature and pressure). Off gas from the two liter reactor evolves at a rate slightly under 7 liters/hour (as measured at standard temperature and pressure) and is fed through a scrubbing tower containing sodium hydroxide. The effluent from the two liter reactor contains 0.07 wt % sodium hypochlorite which corresponds to destruction of 97% of the sodium hypochlorite. The effluent from the 50 ml reactor is devoid of sodium hypochlorite and has a five day B.O.D. of 4 ppm.

EXAMPLE 3

Using the apparatus described in Example 1, an aqueous solution containing 5.33 wt % sodium hypochlorite and 1.1 wt % sodium hydroxide is fed to the two liter reactor at a rate of 37.5 g/minute. A 5 wt % aqueous solution of urea is fed to the two liter reactor at a rate of 5.4 g/minute (50% of theory). Distilled water is fed to the two liter reactor at a rate of 42 cc/minute. Ten percent aqueous sulfuric acid is used to maintain pH 8. The reactor is maintained at 60° C. The liquid effluent from the bottom of the two liter reactor is fed through a 50 ml reactor. After startup sulfur dioxide is bubbled through the 50 ml reactor at a rate of about 100 cc/minute (as measured at standard temperature and pressure). Off gas from the two liter reactor evolves at a rate of about 4.5 liters/hour (as measured at standard temperature and pressure) and is fed through a scrubbing tower containing sodium hydroxide. The liquid effluent from the two liter reactor contains 0.15 wt % sodium hypochlorite which corresponds to destruction of 93.5% of the sodium hypochlorite. The effluent from the 50 ml reactor is devoid of sodium hypochlorite and has a five day B.O.D. of 1 ppm.

EXAMPLE 4

Using the apparatus described in Example 1, an aqueous solution containing 5.16% sodium hypochlorite and 1.01 wt % sodium hydroxide is fed to the two liter reactor at a rate of 35.8 cc/min. A 10 wt % aqueous solution of urea is fed to the two liter reactor at a rate of 3.7 cc/minute (75% of theory). Tap water is fed to the two liter reactor at a rate of 43 cc/minute. Ten percent aqueous sulfuric acid is used to maintain pH 8. The reactor is maintained at 20° C. The liquid effluent from the bottom of the two liter reactor is fed through a 50 ml reactor. Sulfur dioxide is bubbled through the 50 ml reactor at a rate of 70 cc/minute (as measured at standard temperature and pressure). Off gas from the two liter reactor evolves at a rate of 3.9 liters per hour (as measured at standard temperature and pressure) and is fed through a scrubbing tower containing sodium hydroxide. The liquid effluent from the two liter reactor contains 0.175 wt % sodium hypochlorite which corresponds to destruction of 92.4% of the sodium hypochlorite. The effluent from the 50 ml reactor is devoid of sodium hypochlorite and has a five B.O.D. of 14 ppm.

I claim:

1. A continuous process for destroying alkali metal hypochlorite comprising in dilute aqueous solution reacting said alkali metal hypochlorite with from 50 to 90% of the stoichiometrically required amount of urea to react with the hypochlorite, at from 20° to 60° C., using a pH of from 6 to 8.

2. The process of claim 1 wherein the pH is from 7 to 8.

3. The process of claim 2 wherein the alkali metal hypochlorite is reacted with from 70 to 90% of the stoichiometrically required amount of urea to react with the hypochlorite.

4. The process of claim 3 wherein the alkali metal hypochlorite is sodium hypochlorite.

5. The process of claim 1 wherein the alkali metal hypochlorite which has not reacted with urea is reacted with any of sulfur dioxide, sodium sulfite or sodium thiosulfate.

6. The process of claim 5 wherein alkali metal hypochlorite which has not reacted with urea is reacted with sulfur dioxide.

7. The process of claim 1 wherein the alkali metal hypochlorite is sodium hypochlorite.

8. The process of claim 2 wherein the alkali metal hypochlorite is sodium hypochlorite.

* * * * *